United States Patent [19]

Burt

[11] Patent Number: 5,460,735

[45] Date of Patent: Oct. 24, 1995

[54] RECOVERY OF FLOATING LIQUID

[76] Inventor: David A. Burt, 4 Kingsbridge Rd., Bishop's Stortford, Hertfordshire,, Great Britain, CM23 2AD

[21] Appl. No.: 855,043

[22] PCT Filed: Nov. 6, 1990

[86] PCT No.: PCT/GB90/01702

§ 371 Date: May 21, 1992

§ 102(e) Date: May 21, 1992

[87] PCT Pub. No.: WO91/06711

PCT Pub. Date: May 16, 1991

[30] Foreign Application Priority Data

Nov. 6, 1989 [GB] United Kingdom ............... 8924980

[51] Int. Cl.⁶ .................................................. E02B 15/04
[52] U.S. Cl. ........................ 210/776; 210/242.3; 210/923
[58] Field of Search ............................ 210/693, 776, 210/242.3, 242.4, 923, 924

[56] References Cited

U.S. PATENT DOCUMENTS

| | | | |
|---|---|---|---|
| 4,021,344 | 5/1977 | Webb | 210/923 |
| 4,051,024 | 9/1977 | Lowe et al. | 210/242.4 |
| 4,368,122 | 1/1983 | Ravagnan | 210/242.3 |
| 4,642,185 | 2/1987 | Turner et al. | 210/242.3 |
| 4,741,827 | 5/1988 | Klinar et al. | 210/242.3 |

FOREIGN PATENT DOCUMENTS

| | | |
|---|---|---|
| 1183067 | 3/1970 | United Kingdom . |
| 1523590 | 9/1978 | United Kingdom . |
| 2041231 | 9/1980 | United Kingdom . |

Primary Examiner—Ivars Cintins
Attorney, Agent, or Firm—Wood, Phillips, VanSanten, Clark & Mortimer

[57] ABSTRACT

A skimmer device for recovering a first liquid which is floating on a second liquid, e.g. oil on water, uses one or more discs rotating in a plane transverse to the liquid surface (preferably inclined at 70° or less to the liquid surface). Particular benefits accrue, especially when operating in open water, when an inclination angle of 45° or less is used. With a disc inclination angle of 25°–30° to the liquid surface a near optimal compromise is reached between oil take-up rate and ease of collection. Further advantages are obtained with skimmer discs of polymethyl methacrylate resin.

20 Claims, 4 Drawing Sheets

RECOVERY OF FLOATING LIQUID

TECHNICAL FIELD

The present invention relates to an improved method and apparatus for recovering a liquid which is floating on another liquid, for example, oil floating on water, or oil of low specific density floating on oil of higher specific density.

BACKGROUND OF THE INVENTION

It is known to remove oil from water on which it is floating using devices called oleophilic skimmers. These oleophilic skimmers are rotating discs usually provided in sets, mounted on axes parallel to the liquid surface such that each disc is partially immersed in the liquid. As each disc rotates, the surfaces of the immersed portion thereof become coated with oil which is then carried away from the bulk liquid as the disc continues to rotate. The oil is removed from each disc at a point further along the rotation path by a scraper or blade associated with the disc and is then channelled to the oil outlet or tank.

SUMMARY OF THE INVENTION

Examples of oleophilic skimmer apparatus are described in British patents numbers 1419114, 1523590 and 1554458 as well as in published British patent applications 2041231, 20508556 and 2156234.

It has now been found that improved oil recovery rates may be obtained using an oleophilic skimmer apparatus in which at least one disc is provided rotating in a plane which is inclined at an acute angle to the liquid surface.

In particular, it has been found that the uptake of oil by the disc, or discs, increases as the angle between the plane of the disc and the liquid surface decreases. However, at low angles, although the rate of uptake of oil is still high, emulsification of the floating oil begins to occur. That is, at disc inclination angles of about 15° and lower, the shear forces acting on the floating oil globules tend to disrupt the globules and cause an emulsion to form. This impairs the performance of the apparatus.

Accordingly, in order to obtain a good rate of oil recovery, whilst avoiding the problems of emulsification of the floating oil, it would be preferable to angle the oleophilic skimmer disc, or discs, at about 20° to the liquid surface. Furthermore, some tests have shown a peak in recovery rates using discs angled at 20° to the liquid surface.

In practice, there are difficulties in physically collecting the oil taken up by a disc angled at so shallow an angle as 20° to the liquid surface. It has been found to be simpler to collect the oil using a slightly greater angle of disc inclination (25°–30°) and a reasonably high rate of oil uptake has still been achieved. For smaller discs, having a diameter of 280 mm for example, an inclination angle of 25° has been found to provide an optimal compromise between rate of oil uptake and ease of collection. For larger discs, having diameters of 1–2 metres, a somewhat greater angle of 28° provides a better compromise position. For discs of even greater diameter a slightly larger inclination angle than 28° may be necessary, but it is believed that the rate of change of the optimal angle with increasing disc diameter levels off and it is not expected to exceed more than about 30° even for extremely large discs.

Another advantage of using oleophilic discs inclined at an acute angle to the liquid surface (e.g. inclined at about 70° or less to the liquid surface) is that it is possible to collect the oil without impurities if the peripheral speed of the disc is appropriately selected (the required speed varies with the type of oil being collected). In particular, by selecting the correct rotational speed for an inclined disc it becomes possible to collect oil omitting even the impurities which cause a coloured appearance (i.e. the collected oil is colourless).

Furthermore, when using oleophilic skimmer discs inclined at an acute angle to the liquid surface (e.g. inclined at about 70° or less to the liquid surface) an additional advantage is obtained in that the collected liquid is in a purer form. For example, when oil is collected from the surface of a body of water using an oleophilic skimmer disc arranged perpendicular to the liquid surface then the collected liquid tends to include about 15% water (by weight), whereas when the oil is collected using a disc angled at 25°–30° to the liquid surface then the recovered liquid includes only 1½% of water (by weight), and at 20° inclination only ¾% of water is included.

Also, additional advantages are obtained when using oleophilic disks angled at 45° or less to the liquid surface, particularly when the skimmer apparatus is being used in open water where a swell may occur. One such advantage is that it is possible to pick up a group of oils of different types and to separate them out one from the other (i.e. the different types of oil form different layers in the collection tank).

The present invention provides a method and an apparatus for recovering a liquid floating on another liquid, using at least one rotating disc partially immersed in liquid and having an axis of rotation transverse to the liquid surface.

In preferred embodiments of the invention the or each at least one disc is arranged to rotate in a plane inclined at 70° or less to the liquid surface. In some particularly preferred embodiments, an inclination of about 45° or less to the liquid is used, and in other particularly preferred embodiments, an inclination of 25°–30° is used.

Further features and advantages of the present invention will become clear from the following description of embodiments thereof, given by way of example, illustrated and by the accompanying drawings.

BRIEF DESCRIPTION OF THE DRAWINGS

FIGS. 3a and 3b show elevational views of plates A and B (omitting the floats) of FIG. 1, in which: FIG. 3a shows plate A, and FIG. 3b shows plate B;

FIGS. 4a and 4b show the collection tube of FIG. 1 in diagrammatic form, in which:

FIG. 4a is illustrative of the structure and position of the collection tube relative to plates A and B, and FIG. 4b is a section on line C–C' of FIG. 4a, and FIG. 5 illustrates the forces acting on an angled disc in open water where waves occur.

DETAILED DESCRIPTION OF THE PREFERRED EMBODIMENTS

Figure 1:
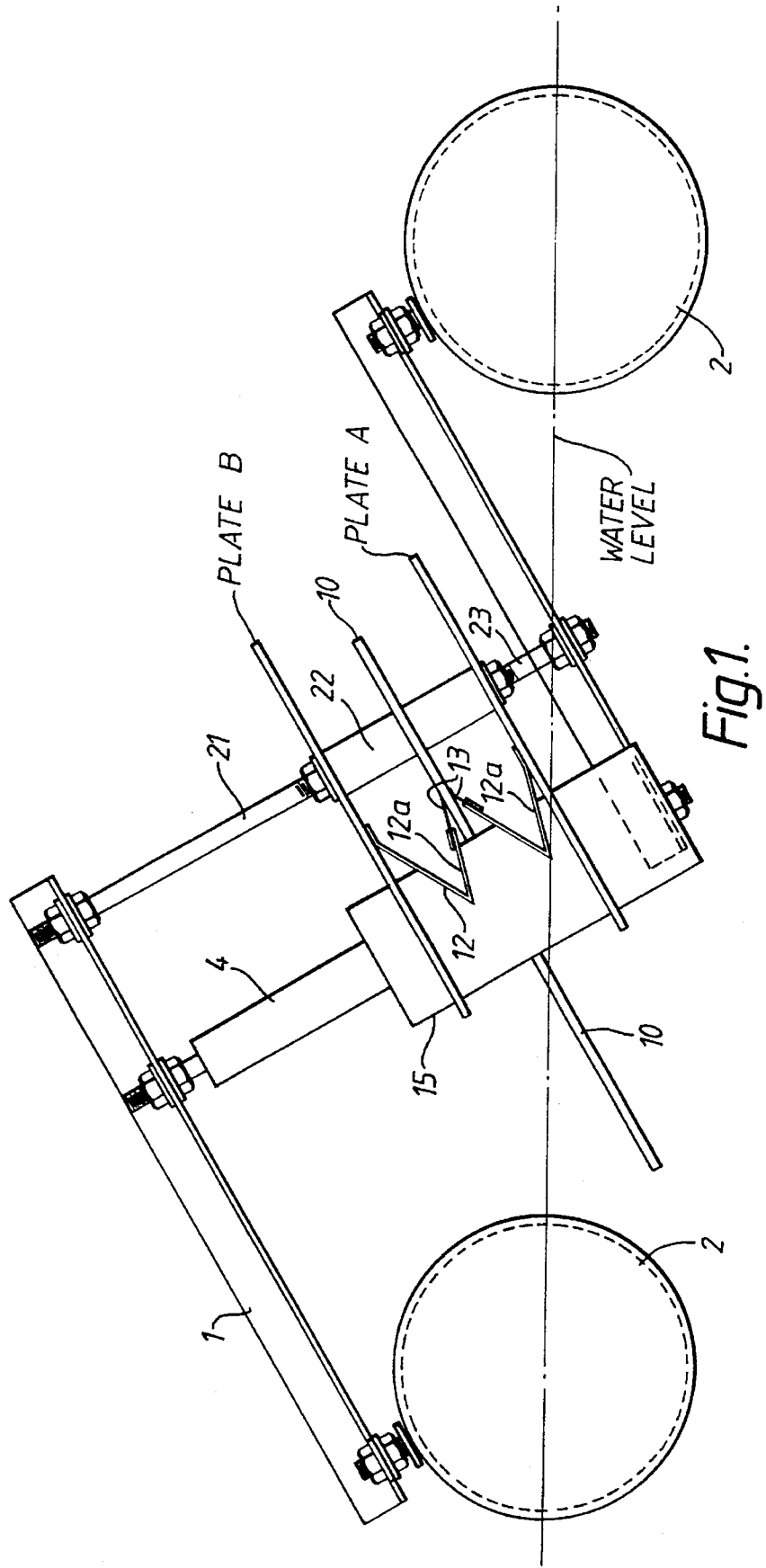
FIG. 1 shows a front elevational view of one embodiment of a skimmer apparatus according to the present invention.

One embodiment of skimmer apparatus according to the present invention is illustrated in FIG. 1. This embodiment will be described in terms of collection of oil from the surface of a body of water.

As is conventional for oleophilic skimmer devices, the apparatus comprises a framework 1 supported on floats 2.

An air motor 4 is provided, mounted at one end of the framework 1, so as to drive the rotation of a "perspex" disc 10 via a drive shaft 5 mounted between two parallel plates A and B. Scrapers 12 are provided, each mounted at one end on plate A, or plate B, respectively and with the other end thereof carrying a rubbing piece 13 which slides on the disc 10 surface. A collection tube 15 mounted on the framework 1 and passing through plates A and B collects the liquid gathered by the scraper 12.

Figure 2:
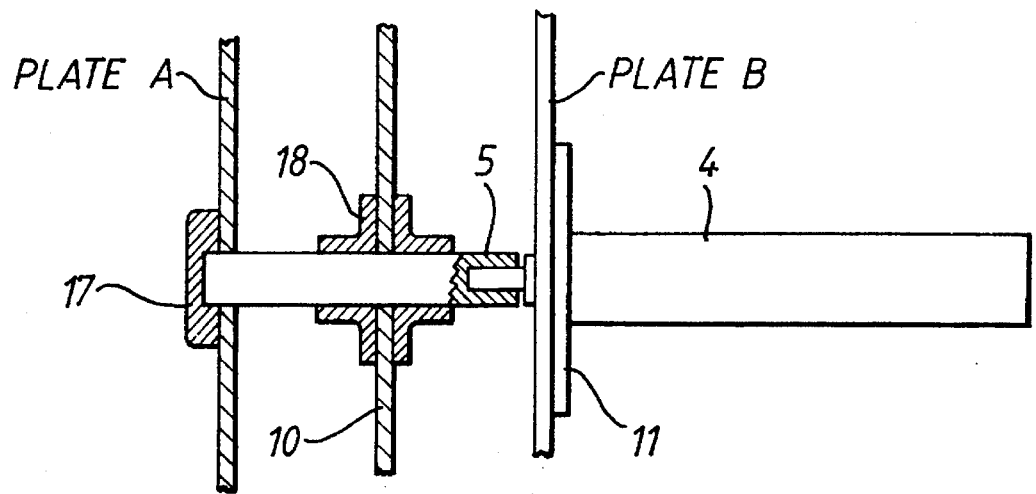
FIG. 2 is an enlarged partial sectional view showing the construction of the drive for the disc in the embodiment of FIG. 1.

The mechanism for driving the rotation of the disc 10 will be described with reference to FIG. 2.

As mentioned above, the air motor 4 is connected at one end to the framework 1. At the other end the motor 4 is attached to plate B by a motor mounting flange 11. The end of the motor shaft extends through plate B and is keyed to one end of the stainless steel drive shaft 5 which extends between plates A and B. The other end of the drive shaft 5 is seated in an end bearing 17 provided on plate A.

The drive shaft 5 serves as an axle on which the disc 10 is mounted. The disc 10 is fixed to the drive shaft 5 via stainless steel retaining flanges 18 which are bolted together through the disc.

The advantage of using an air motor to drive the drive shaft 5 is that this avoids the isolation problems which arise when using electrical motors in such close proximity to water. The air motor is driven by a current of air (supply and feed lines not shown) and the motor speed may be varied by varying the flow rate of the air current. Use of a variable speed motor enables the peripheral speed of the skimmer disc to be adjusted (dependent upon the type of oil being collected) so as to enable the oil to be collected substantially without impurities. A suitable air motor for use in this embodiment is the LBZ11 AROO5 model produced by Atlas Copco.

The dimensions and mounting of the framework 1 on the floats 2, and of the motor 4 and drive shaft 5 to the framework 1, are such that the disc 10 is inclined at an acute angle to the surface on which the floats 2 rest and, when the floats 2 are resting on a liquid surface, a portion of the disc 10 is immersed in the liquid. Rotary movement of the drive shaft 5 causes the disc 10 to rotate in a plane inclined at an acute angle to the surface on which the floats 2 are resting. As best seen in FIG. 1, the rotation of the drive shaft 5 is about an axis of rotation such that the drive shaft 5 and its axis of rotation is also at an acute angle to a horizontal plane. Likewise, the disc 10 is inclined at an acute angle to a laterally extending axis of the floats 2.

The rigidity of the apparatus is assured by a group of threaded rods 21,23 and spacers 22 forming a middle, linking part of the framework 1. One end of each of the threaded rods 21,23 engage the drilled and tapped ends of the spacers 22.

In the embodiment of FIG. 1 the mounting arrangement for the disc 10 is quite rigid so that the disc 10 is inclined to the liquid surface at a constant angle. However, in other embodiments the mounting may be adjustable, either manually or automatically, so as to enable the degree of immersion of the disc and/or the inclination angle to be altered, for example periodically or continuously in response to monitoring means checking the extent of immersion of the disc 10.

Figure 4A:
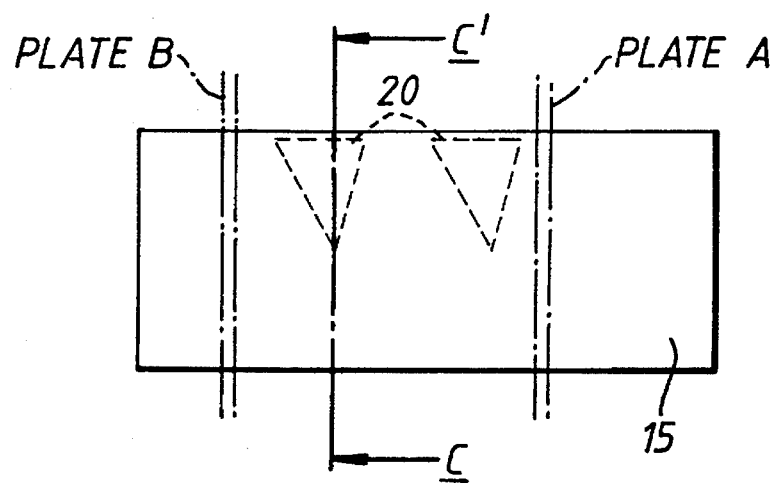
Figure 4B:
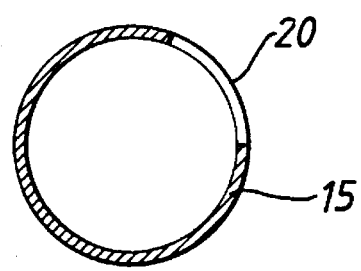
Figure 3A:
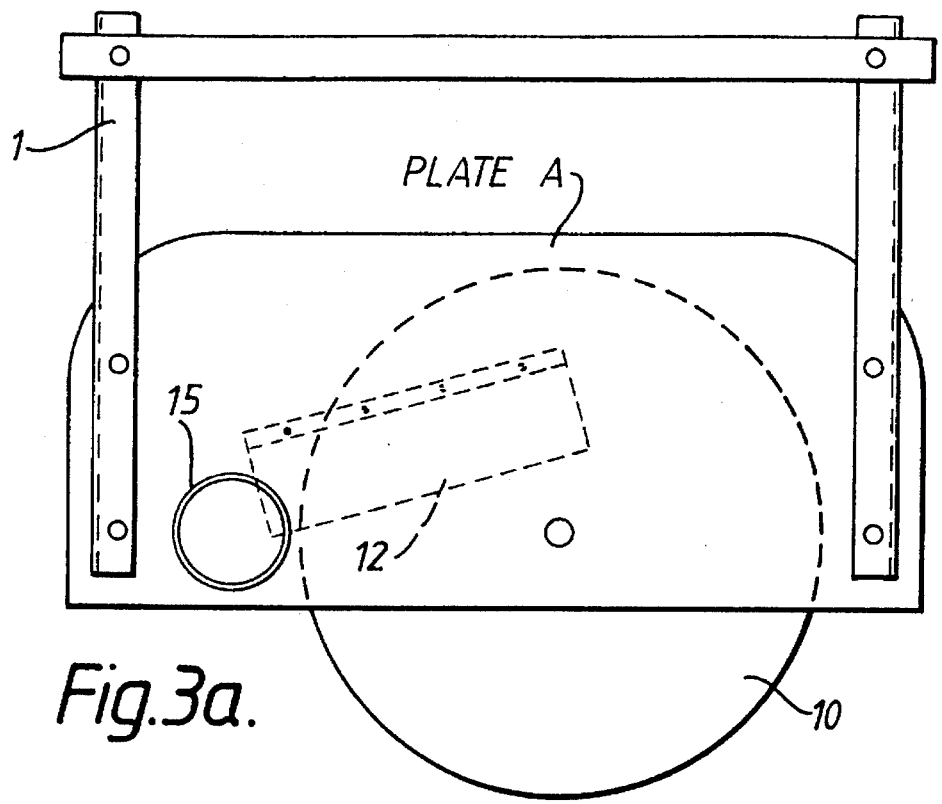
Figure 3B:
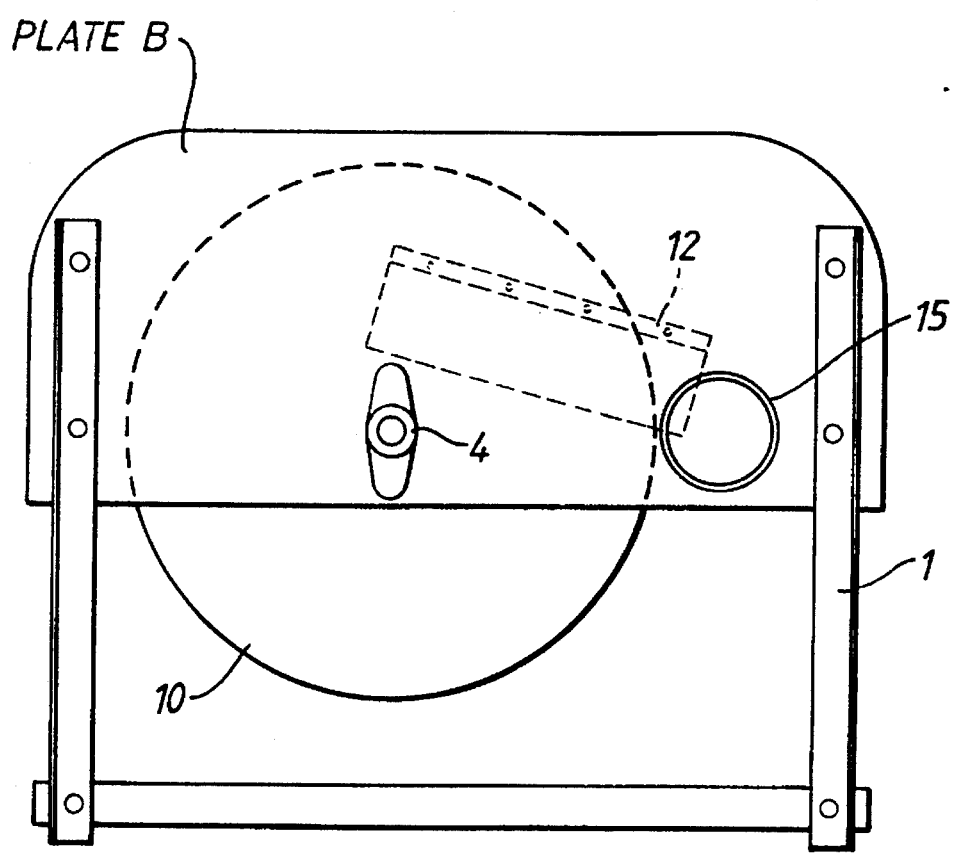

The arrangement of the oil collection portion of the apparatus (i.e. the scrapers 12 and oil collection tube 15) may be seen from a comparison of FIGS. 1, 3 and 4.

Each scraper 12 is an irregular V-shape in cross-section with one of the ends being attached to plate A, or plate B, respectively and the other of the ends attached to a rubbing piece 13 preferably made of "teflon" or polytetrafluoroethene (PTFE).

The mounting of the scrapers 12 on plates A and B is such that one limb 12a of each scraper is downwardly inclined and the apex of the V-shape forms a trough into which will run oil scraped off the disc 10 by the rubbing pieces 13. This "trough" portion of each scraper 12 passes through a respective opening 20 in the side of the collection tube 15 so that oil will flow from the scrapers 12 into the collection tube 15 under gravity.

In the example illustrated by FIG. 1 the scraper limbs 12a are arranged to remove oil from the peripheral 60–70% of the disc diameter, i.e. each scraper limb operates over a length equal to 70% of the radius of the disc. In order for the apparatus as a whole to operate at maximum efficiency the disc 10 should be immersed in liquid such that the outer 70% of the disc becomes wetted.

In operation, the apparatus of FIG. 1 floats at the surface of the liquid which is to be treated. The position of the drive shaft 5 is arranged to give a desired degree of immersion and angle of inclination of the disc 10 relative to the liquid surface. When the motor 4 is switched on, the disc 10 is caused to rotate via the drive shaft 5. As the disc 10 rotates, the immersed portion thereof becomes wetted with oil floating at the surface of the liquid and carries that oil out of the bulk liquid. The rubbing pieces 13 on the scrapers 12 wipe the oil from the surfaces of the disc 10. The oil flows along the downwardly-sloping limbs 12a of the scrapers 12 into the collecting tube 15. The collecting tube 15 may be provided with an outlet through which the collected oil may be continuously removed, by gravity or pumping, for example into an accompanying tanker.

The effect on oil recovery rates of the angle of inclination of the disc 10 is substantial, as the following Tables 1 and 2 show. In each case a single disc of diameter 28 cm was used on water bearing a layer approximately 10 mm deep of automatic transmission hydraulic oil.

TABLE 1

| Rotational Speed 26 rpm | |
| --- | --- |
| Angle of inclination of disc to liquid surface (degrees) | Oil Recovery rate (Liters/Hour) |
| 90 | 73 |
| 45 | 104 |
| 28 | 124 |
| 20 | 160 |

TABLE 2

| Rotational Speed 44 rpm | |
| --- | --- |
| Angle of inclination of disc to liquid surface (degrees) | Oil Recovery rate (Liters/Hour) |
| 90 | 146 |
| 45 | 208 |
| 28 | 248 |
| 20 | 320 |

Embodiments of the invention may include more than one disc although in general this would require a separate drive shaft, or axle, to be used for each disc and so would produce a more bulky structure.

The discs 10 used in oil recovery embodiments may be made from the usual materials which are relatively inert to water (fresh or salt) and oil, such as metals and plastic (e.g. stainless steel, polyvinylchloride). However it has been found that a marked improvement in oil recovery rate occurs when polymethyl methacrylate resin (Lucite,"Perspex") discs are used.

Compare the test results shown in Tables 3,4 and 5 below. In each case a disc of 280 mm diameter was used in a tank on a body of water having on its surface a 29 mm layer of motor engine oil. The water was continuously recirculated through the tank. All speeds are measured in revolutions per minute and angles are measured relative to the horizontal. Recovery rates of oil are measured in litres/hour.

TABLE 3

Stainless Steel Disc

| Angle of Disc Inclination | Recovery at 26 rpm | Recovery at 28 rpm | Recovery at 35.5 rpm |
| --- | --- | --- | --- |
| 90° | 73 | — | — |
| 45° | 104 | 137 | 173 |
| 28° | 124 | 156 | 192 |
| 20° | 160 | — | — |

TABLE 4

Stainless Steel Disc with improved scraper
(P.T.F.E.) and enlarged take off channel

| Angle of Disc Inclination | Recovery at 26 rpm | Recovery at 40 rpm | Recovery at 57 rpm |
| --- | --- | --- | --- |
| 45° | 115 | 192 | 294 |
| 15° | 215 | 294 | 379 |

TABLE 5

"Perspex" Disc

| Angle of Disc Inclination | Recovery at 22 rpm | Recovery at 30 rpm |
| --- | --- | --- |
| 90° | 158 | 203 |
| 45° | 185 | 300 |
| 25° | 195 | 379 |

(N.B. Inferior results for 22 rpm at angles of inclination closer to the horizontal due to emulsification)

It will be seen from the above tables that a "Perspex" disc of comparable size to a stainless steel disc and operating at similar speeds provides significantly greater take-off rates of oil. For speeds of rotation up to at least 40 rpm rate of oil removal is approximately proportional to the speed of rotation. It is believed that "Perspex" gives these improved results because of the material's electrolytic, or electrostatic, properties. Thus it is expected that other materials having similar, or comparable, electrolytic or electrostatic properties will also be advantageous disc materials.

When using discs of polymethyl methacrylate resin it is necessary to use discs of appreciable thickness so as to provide sufficient rigidity and strength (excessive flexure of the disc makes collection of liquid from the disc surface difficult, however some flexibility is useful in order to enable the disc to withstand shock stresses, e.g. from waves). In theory it would be possible to use very thick discs (even going so far as to use a rotating tilted cylinder to replace a disc) but in practice the circumferential surface of the disc can cause undesirable edge effects in the liquid surface, such as eddies, if the discs become too thick.

For smaller discs, for example 280 mm in diameter, a thickness of 5 or 10 mm is adequate. For larger discs, for example 1 metre in diameter, a thickness of 20 mm or more may be necessary. In order to minimise the undesirable edge effects that may occur when using a thick disc, whilst maintaining the desired strength and rigidity, the disc may be tapered or stepped so as to have a thicker portion at the centre of the disc and a thinner portion at the disc edge.

Another advantage provided by polymethyl methacrylate resin discs is that any scoring of the disc surface (for example caused by abrasion by solid particles in the water) is smoothed away relatively quickly by the action of the collected oil or the like on the disc surface.

The size of the discs and of the overall apparatus may be tailored to the particular use to be made of the apparatus.

For example, there are two main types of environment in which skimmer apparatus according to the invention is likely to be used. Firstly, it may be used in a separation tank such as that described in our copending European patent application no. 90307609.9, to help purify effluent passing through such a tank. In such a case smaller discs may be appropriate (e.g. 290 mm, 314 mm in diameter). Secondly, skimmer apparatus may be used in open water, such as the sea, in order to clear up oil slicks and the like. Here an appropriate disc size should be chosen bearing in mind the likely swell which will be experienced (e.g. a 1 m diameter disc should be suitable where a ½ m swell is expected). For open sea work the apparatus should cater for a swell of 2 metres, in which case a 4 metre diameter disc would be appropriate (if formed of polymethyl methacrylate, such a disc would probably require a thick central region, perhaps 40 mm thick, and could be stepped or tapered to a thin edge region).

The requirements on a skimmer intended for use in open water are rather different from those on a skimmer intended for use in a separation tank. For example, a skimmer used in a tank need not have floats to keep it in position but could instead be mechanically fixed to the tank walls. More significantly, a skimmer used in open water is likely to experience considerable forces because of wave action and an angled skimmer disc suffers the additional problem of waves lapping over the top edge of the disc. These problems are discussed further below in relation to FIG. 5.

Figure 5:
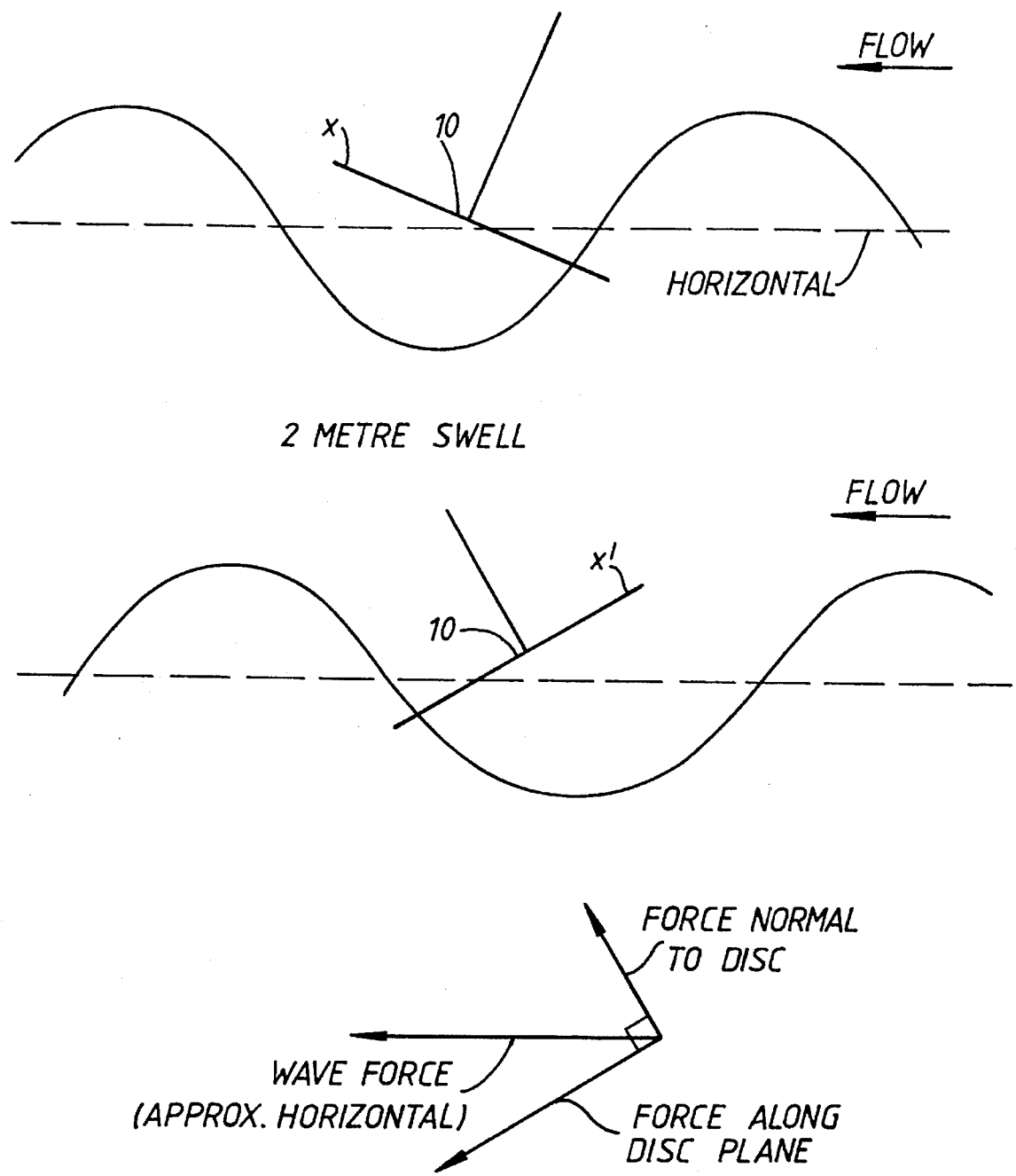

As will be seen from FIG. 5, when an angled disc is used, for example, in the sea, waves may occur of sufficient height to sweep over the upper disc edge x, x'. This would impair the operation of the skimming apparatus. One way of overcoming this is to increase the angle between the plane of the disc and the liquid surface (assumed to be approximately horizontal) but that leads to a reduction in the take-up of oil or the like by the disc. Furthermore, as the disc becomes more nearly vertical the (wave action) forces on the disc in a direction tending to snap the disc increase. Preferably the disc(s) of skimmer apparatus used in open water should be angled at 45° or less to the liquid surface (assumed to be approximately horizontal). At greater angles of inclination the wave forces acting on the disc are greater in the direction tending to snap the disc than in the disc plane and, furthermore, the recovery rate of oil or the like decreases. The exact angle that can be used will depend to some extent on the size of the disc (as well as depending on the swell expected to be experience). With suitable shielding of the apparatus, to prevent waves from running over the upper edge of the disc, very low angles of inclination should be possible and thus greater recovery rates of oil or the like should be obtainable.

Embodiments of the invention may use floats such that it is possible to alter their buoyancy to compensate for the weight of oil or the like collected and maintain the required depth of immersion.

Although the above specific description has been given in terms of recovery of oil from the surface of a body of water, the invention is applicable far more generally to the separation of liquids having different specific densities and viscosities.

There are a number of modifications that may be made to skimmer apparatus according to the invention. For example, a hood may be provided over the disc so as to catch oil or the like which is flung upward off the disc surface as a result of the disc rotation. The hood shape is adapted to funnel the "caught" liquid into a separate tank or into the main collection tank of the apparatus.

It is also possible to add one or more flanges on the circumferential edge of the disc, or on the disc surface, so as to form a rim projecting out of the plane of the disc, with the aim of trapping oil or the like which may be moving outward along the disc's major surface(s). However, although such flanges can improve the recovery rate of skimming apparatus, it is difficult to collect the trapped liquid from the flanges and the collected liquid as a whole seems to be less pure (e.g. when collecting oil from the surface of water using an angled disc having such a circumferential flange it has been found that the collected liquid contains 11–13% water by weight).

It is preferable when using discs composed of polymethylmethacrylate resin to use rubbing pieces composed of a softer material so as not to scratch the disc. Softer material than PTFE is preferred.

Finally, in outdoor conditions, or in wet/windy conditions where the skimmer has no protection, it is advisable to provide a cover over the apparatus.

What is claimed is:

1. A method of recovering a first liquid from the surface of a second liquid on which said first liquid is floating, the method comprising the steps of:

providing a disc having a peripheral edge;

mounting the disc to a drive shaft for rotation therewith;

supporting the disc and drive shaft in an operative position on the surface of at least one of the first and second liquids so that a portion of the disc peripheral edge is immersed in the first liquid, there being a reference plane that extends through the disc parallel to the upper surface of the first liquid with the first and second liquids in a static state and the disc and drive shaft in an operative position;

rotating the drive shaft about a first axis that is at all times at an angle of 20°–70° with respect to the reference plane.

2. A method according to claim 1 wherein the providing step comprises providing a disc comprising polymethyl methacrylate resin.

3. The method according to claim 1, wherein the providing step comprises providing the disc with a substantially flat surface and the mounting step comprises mounting the disc to the drive shaft for rotation therewith so that the flat surface is substantially perpendicular to the first axis during rotation of the drive shaft.

4. A method according to claim 1, wherein the rotating step comprises causing the drive shaft to rotate about the first axis such that the angle defined by the first axis relative to the reference plane is at most 45 degrees.

5. A method according to claim 1, wherein the rotating step comprises causing the drive shaft to rotate about the first axis such that the angle defined by the first axis relative to the reference plane is in a range of approximately 25 degrees to approximately 30 degrees.

6. A method according to claim 1, wherein the rotating step comprises causing the drive shaft to rotate about the first axis such that the angle defined by the first axis relative to the reference plane is approximately 20 degrees.

7. A method according to claim 1 wherein the providing step comprises providing a plurality of discs and the mounting step comprises mounting the plurality of discs to a drive shaft for rotation therewith.

8. An apparatus for recovering a first liquid from the surface of a second liquid on which said first liquid is floating, the apparatus comprising:

a shaft;

a disc mounted on said shaft for rotation therewith;

means for supporting the disc and shaft in an operative position on the surface of at least one of the first and second liquids, there being a reference plane that extends through the disc parallel to the upper surface of the first liquid with the first and second liquids in a static state and the disc and shaft in an operative position; and means for rotating the shaft about a first axis of rotation whereby the first axis is at all times at an angle of 20°–70° with respect to the reference plane.

9. Apparatus according to claim 8 wherein the disc comprises polymethyl methacrylate resin.

10. Apparatus according to claim 8 wherein the means for rotating the shaft comprises an air motor.

11. Apparatus according to claim 8 wherein the means for rotating the shaft comprises a variable speed motor.

12. Apparatus according to claim 8 wherein the disc varies in thickness having a relatively thick central portion and a relatively thin circumferential portion.

13. Apparatus according to claim 8 and comprising a plurality of discs mounted on said supporting means so that each disc rotates in use in a fixed plane relative to the reference plane at an acute angle thereto.

14. Apparatus according to claim 13 wherein the angle for each said plurality of discs is approximately 45° or less.

15. Apparatus according to claim 13 wherein the angle for each said plurality of discs is approximately 25°–30°.

16. The apparatus of claim 8, wherein the disc has a substantially flat surface perpendicular to the first axis.

17. Apparatus according to claim 8 wherein the angle defined by the first axis relative to a horizontal plane is at most 70 degrees.

18. Apparatus according to claim 8 wherein the angle defined by the first axis relative to a horizontal plane is at most 45 degrees.

19. Apparatus according to claim 8 wherein the angle defined by the first axis relative to a horizontal plane is in a range of approximately 25 degrees to approximately 30 degrees.

20. Apparatus according to claim 8 wherein the angle defined by the first axis relative to a horizontal plane is approximately 20 degrees.

* * * * *